(12) United States Patent
Schaefer

(10) Patent No.: US 10,634,267 B2
(45) Date of Patent: *Apr. 28, 2020

(54) SEPARATION DUCT HAVING LONGITUDINAL SPACERS

(71) Applicant: SubCom, LLC, Eastontown, NJ (US)

(72) Inventor: Thomas E. Schaefer, Fords, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/414,011

(22) Filed: May 16, 2019

(65) Prior Publication Data

US 2019/0293210 A1    Sep. 26, 2019

Related U.S. Application Data

(63) Continuation of application No. 15/686,341, filed on Aug. 25, 2017, now Pat. No. 10,337,652.

(60) Provisional application No. 62/410,084, filed on Oct. 19, 2016.

(51) Int. Cl.
| | | |
|---|---|---|
| *F16L 7/00* | (2006.01) |
| *H02G 1/08* | (2006.01) |
| *H02G 9/06* | (2006.01) |
| *F16L 57/00* | (2006.01) |
| *F16L 1/12* | (2006.01) |
| *H02G 9/02* | (2006.01) |

(52) U.S. Cl.
CPC .............. *F16L 7/00* (2013.01); *F16L 1/123* (2013.01); *F16L 57/00* (2013.01); *H02G 1/08* (2013.01); *H02G 9/065* (2013.01); *H02G 9/02* (2013.01)

(58) Field of Classification Search
CPC ... F16L 7/00; F16L 1/123; H02G 1/08; H02G 3/0481; H02G 9/065
USPC .......................... 138/108, 112–114, 158, 161
See application file for complete search history.

(56) References Cited

U.S. PATENT DOCUMENTS

| | | | | |
|---|---|---|---|---|
| 1,153,159 A | * | 9/1915 | Gray | F16L 7/00 138/112 |
| 2,551,710 A | * | 5/1951 | Slaughter | F21V 17/04 362/355 |
| 3,785,407 A | ‡ | 1/1974 | Waite | F16L 59/08 138/10 |
| 4,688,890 A | ‡ | 8/1987 | DeMeo | G02B 6/4463 138/10 |

(Continued)

FOREIGN PATENT DOCUMENTS

| | | | | |
|---|---|---|---|---|
| DE | 299 18 882 U1 ‡ | 1/2000 | | F16L 7/00 |
| DE | 10 2013 108856 A1 ‡ | 2/2015 | | F16L 7/00 |
| EP | 0 221 481 A1 ‡ | 5/1987 | | G02B 6/4459 |

OTHER PUBLICATIONS

International Search Report, Application No. PCT/IB2017/055699, International Filing Date, Sep. 20, 2017.‡

*Primary Examiner* — Patrick F Brinson

(57) ABSTRACT

A separation duct for encompassing an elongate member. The duct includes longitudinal internal spacers extend longitudinally in a direction of a longitudinal axis of the duct. A longitudinal plane for each spacer is substantially parallel to the longitudinal plane of the other spacers. The spacers support the elongate member and resist slippage of the duct relative to the elongate member. The duct may be used to provide separation and protection for elongate members of a range of outside dimensions.

18 Claims, 3 Drawing Sheets

(56) References Cited

U.S. PATENT DOCUMENTS

| | | | | |
|---|---|---|---|---|
| 6,112,770 A | ‡ | 9/2000 | Walsh | H02G 3/0481 138/10 |
| 2007/0051419 A1 | ‡ | 3/2007 | Walsh | F16L 7/00 138/15 |
| 2013/0213515 A1 | ‡ | 8/2013 | Secoura | F16L 59/14 138/14 |

\* cited by examiner
‡ imported from a related application

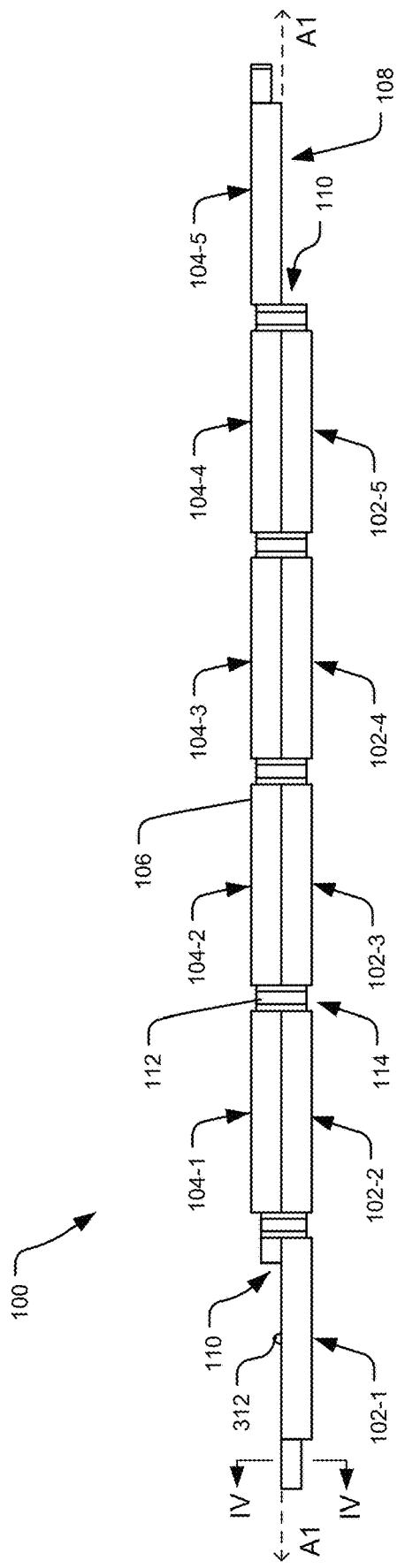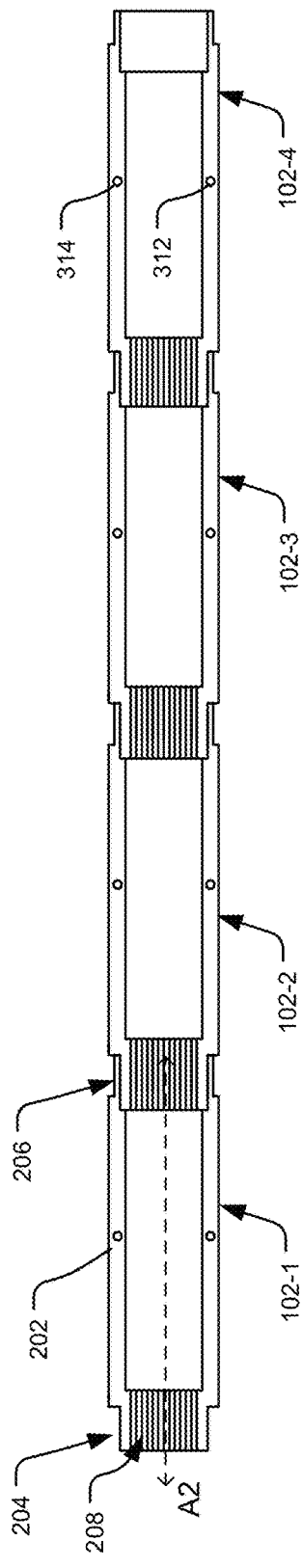
FIG. 1
FIG. 2

SEPARATION DUCT HAVING LONGITUDINAL SPACERS

CROSS-REFERENCE TO RELATED APPLICATIONS

This application is a Continuation of, and claims the benefit of priority to, U.S. patent application Ser. No. 15/686,341, filed Aug. 25, 2017, entitled "SEPARATION DUCT HAVING LONGITUDINAL SPACERS," and to U.S. Provisional Application No. 62/410,084, filed Oct. 19, 2016, entitled "Separation Duct Having Longitudinal Spacers" which applications are incorporated herein by reference.

TECHNICAL FIELD

The present disclosure relates to a separation ducts having longitudinal spacers for receiving elongate members and separating the elongate member from other structures.

BACKGROUND

Elongate members such as optical or electrical cable, pipelines, risers used in hydrocarbon extraction, etc., particularly but not exclusively those deployed underwater, are often positioned adjacent other structures such as other elongate members, buildings, rock formations, etc. There is often a need to provide physical separation between the elongate members and the other structures to protect the elongate member and/or the other structures from damage. For example, in the case of an undersea optical cable the cable may cross over an undersea oil or gas pipeline. To avoid damage to the cable and/or the pipeline, the cable is often encompassed within a separation duct. The separation duct establishes a separation distance between the cable and the pipeline and may be formed of a material that will not damage the pipeline in the event of contact between the pipeline and the separation duct. One example of such a separation duct is described in U.S. Patent Application Publication No. US2007/0051419, the teachings of which are hereby incorporated herein by reference.

One challenge associated with known separation duct configurations is that there has been a need match the internal dimensions of the separation duct with the external dimensions of the elongate member to be received thereby. If the separation duct is too large compared to the cable, the separation duct may not properly grip the cable and may slip along the length thereof to an undesirable position. If the separation duct is too small, it may not fit around the cable. These problems are exacerbated when, for example, an elongate member and separation duct are deployed via a ship at sea and the ship has been mistakenly loaded with separation duct of an incorrect size. In such a case, the ship may be required to return to port to obtain a correct size of separation duct and then return to the location where the elongate member is to be deployed. This can result in significant delays and cost increases associated with deployment of the elongate member.

BRIEF DESCRIPTION OF THE DRAWINGS

Reference should be made to the following detailed description which should be read in conjunction with the following figures, wherein like numerals represent like parts:

FIG. 1 is a side view of a separation duct consistent with the present disclosure.

FIG. 2 is a top view of a bottom portion of a separation duct consistent with the present disclosure.

DETAILED DESCRIPTION

Figure 3:
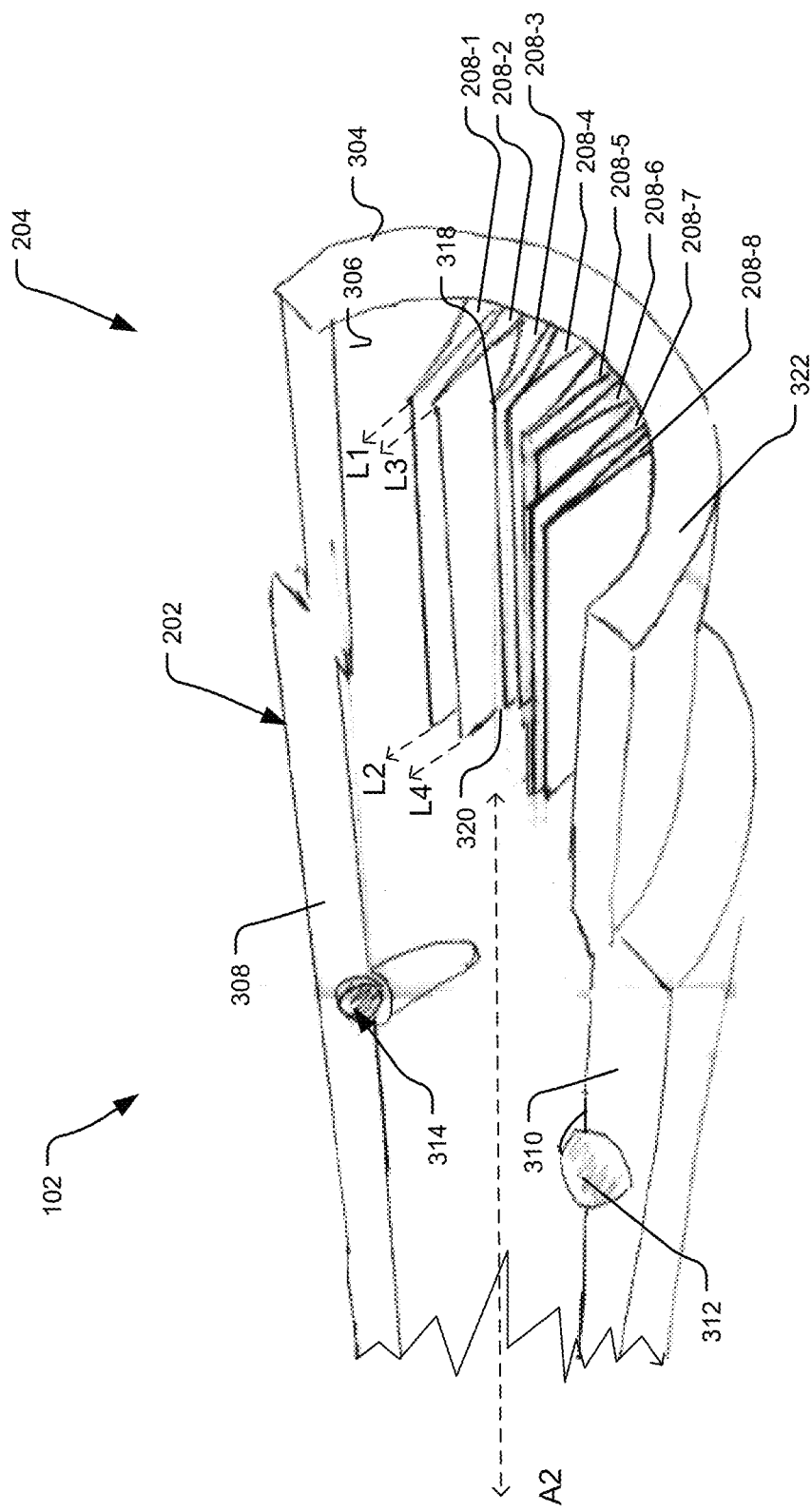
FIG. 3 is a perspective view of one segment of a separation duct consistent with the present disclosure.

In general, a separation duct consistent with the present disclosure includes a plurality of longitudinal internal spacers extending inwardly away from an inner surface at intervals along a length of the duct. The longitudinal internal spacers extend longitudinally in a direction of a longitudinal axis of the duct. A longitudinal plane associated with each of the spacers is substantially parallel with a longitudinal plane associated with the other ones of the spacers. The longitudinal plane associated with each of the spacers is a plane extending along a length of the spacer and through a top and bottom of the spacer.

Advantageously, the longitudinal spacers support the elongate member centrally within an internal cavity of the separation duct and separate the elongate member from the exterior surface of the duct by a desired distance. This separation is useful in avoiding damage to the elongate member and/or other adjacent structures. Contact between the spacers and the elongate member along the length of the spacers also provides frictional resistance to slippage between the duct and the elongate member. Advantageously, a separation duct consistent with the present disclosure may be used to encompass elongate members of different outside diameters. This substantially avoids difficulties associated with providing incorrectly sized separation duct for use with a particular elongate member.

FIG. 1 is a side view of one example of a separation duct 100 consistent with the present disclosure. The illustrated embodiment includes a plurality of separation duct segments 102-1, 102-2, 102-3, 102-4, 102-5 and 104-1, 104-2, 104-3, 104-4, 104-5 coupled to form a duct 100 with an exterior surface 106, an interior surface 108, a central cavity 110 and a longitudinal axis A1. Although embodiments illustrated herein may be described in connection with a duct formed of separation duct segments, a separation duct consistent with the present disclosure may be provided in other configurations, such as a split tube.

In the illustrated embodiment, the separation duct segments 102-1, 102-2, 102-3, 102-4, 102-5 and 104-1, 104-2, 104-3, 104-4, 104-5 have identical configurations. Each separation duct segment may be a unitary molding formed of an elastomeric material, such as polyurethane. In the illustrated embodiment, each of a first group of the separation duct segments 102-1, 102-2, 102-3, 102-4, 102-5 is positioned in opposed facing relationship to an associated one of a second group 104-1, 104-2, 104-3, 104-4, 104-5 of the separation duct segments to define the central cavity 110 in which the elongate member is disposed. The separation duct members are coupled to each other by tension bands, e.g. tension band 112, provided at reduced external dimension areas, e.g. area 114.

FIG. 2 is a top view of the separation duct segments 102-1, 102-2, 102-3, 102-4, shown in FIG. 1 (i.e. with the separation duct segments 104-1, 104-2, 104-3, 104-4, in FIG. 1 removed). Each separation duct segment, e.g. segment 102-1, includes an elongate body 202 having a first end 204 and a second end 206. In the illustrated exemplary embodiment, the first end 204 defines a spigot formed as a reduced external diameter portion of the elongate body 202 and the second end 206 defines a socket formed of an increased internal diameter portion of the elongate body 202. Axially adjacent separation duct segments, e.g. segments 102-1 and 102-2, engage with each other by a mating connection of the spigot of one separation duct segment matingly engaged with the socket of the axially adjacent separation duct segment.

The first end 204 of the elongate body 202 includes a plurality of resiliently deformable longitudinal spacers 208. When separation duct segments are disposed in opposed facing relationship, e.g. as shown in FIG. 1, longitudinal spacers 208 of the opposing ones of the separation duct segments are in opposed facing relation to each other at the educed external diameter areas, e.g. area 114 (FIG. 1), at intervals along the length of the duct 100 (FIG. 1). The tension bands, e.g. band 114 (FIG. 1), compress the longitudinal spacers 208 against an elongate member.

Although the illustrated exemplary embodiment includes a plurality of separation duct segments, each having a single set of spacers at one end thereof, those of ordinary skill in the art will recognize that any number of sets of spacers may be provided along the length of a separation duct segment consistent with the present disclosure. The spacers may be placed at any interval along the length of the segment at locations of reduced diameter. A tension band may be placed at each section of reduced diameter to compress the spacers against an elongate member. The separation duct segments positioned on either side of the elongate member may have identical configurations and the segments on one side may overlap the segments on the other side by 50%. The sets of spacers in each segment are however provided in opposed facing relationship to each other along the length of a duct consistent with the present disclosure so that the tension bands compress spacers onto opposite sides of the elongate member.

FIG. 3 is an isometric view of one example of a separation duct segment 102 consistent with the present disclosure. The segment includes an elongate body 202 with an exterior surface 304 and an inner surface 306 that are bridged at ends thereof by associated mating faces 308, 310. In the illustrated exemplary embodiment, the segment 102 is generally semi-annular in shape with a convex semi-circular exterior surface 304 and a convex semi-circular inner surface 306 and the mating faces 308, 310 lying in a common plane. The terms "semi-annular" and "semi-circular" as used herein refers to any portion of an annular or circular shape, respectively. Those of ordinary skill in the art will recognize the outer 304 and inner 306 surfaces need not be semi-circular and may take different shapes with various features thereon. Also, the mating faces 308, 310 need not lie in the same plane.

Each separation duct segment 102 may include a projection 312 on one mating face 310 thereof and a recess 314 on the opposite mating face 308 thereof. The projection 312 and recess 314 may mate with a corresponding projection and recess of a separation duct segment positioned in opposed facing relationship to align the separation duct segments and restrict relative axial motion of the segments.

Figure 4:
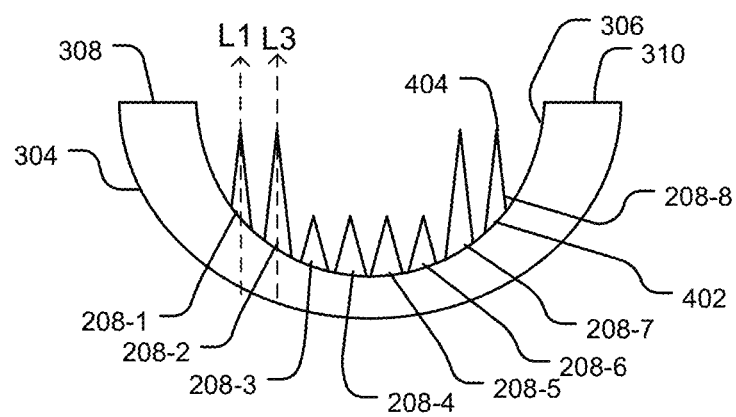
FIG. 4 is sectional view of one segment of the separation duct consistent with the present disclosure taken along lines IV-IV in FIG. 1.

The example embodiment illustrated in FIG. 3 includes eight (8) longitudinal spacers 208-1 . . . 208-8 at the end 204 of the elongate body 202. The longitudinal spacers 208-1 . . . 208-8 each have a bottom at the inner surface 306 of the elongate body 202 and a top spaced from the inner surface 306 such that the spacers 208-1 . . . 208-8 project inwardly from the inner surface 306. With reference also to FIG. 4, the spacer 208-8 for example has a bottom 402 and a top 404. The spacers 208-1 . . . 208-8 have a first end positioned adjacent a first end 204 of the body 202 and extend longitudinally in the direction of a central axis A2 of the elongate body 202 toward a second end. The spacer 208-3, for example has a first end 318 and a second end 320. The first end of the spacers 208-1 . . . 208-8 may be positioned flush with an end face 322 of the elongate body 202 or may be spaced therefrom.

The spacers 208-1 . . . 208-8 have a length measured in the direction of a central axis A2 of the elongate body 202 from the first end of the spacer to the second end of the spacer that is longer than their width measured in a direction transverse to the central axis A2 of the elongate body 202. The spacers have a height measured from the inner surface 306 in a direction from the bottom to the top of the spacer.

The length of the spacers 208-1 . . . 208-8 may be chosen to provide desired support for an elongate member and desired contact with the elongate member to avoid slippage of the elongate member. The width and height of the spacers 208-1 . . . 208-8 may be chosen such that elongate members of a range of external dimension may be supported by the spacers 208-1 . . . 208-8 with the elongate member being positioned substantially centrally within the cavity 110 (FIG. 1) formed by the segments. In the illustrated exemplary embodiment, the spacers 208-1 . . . 208-8 are generally triangular in shape and narrow in width from the bottom to the top. Those of ordinary skill in the art will recognize that other shapes for the spacers are possible. Also, in the illustrated embodiment, the spacers 208-1 . . . 208-8 closest to the respective mating faces 308, 310 have a height greater than the spacers 208-1 . . . 208-8 furthest from the respective mating faces 308, 310 and the spacers 208-1 . . . 208-8 do not extend inwardly beyond the mating faces 308, 310. This configuration helps to center the elongate member within the cavity 110 (FIG. 1).

The spacers 208-1 . . . 208-8 may be positioned on either side of the central axis A2 and may cover only about 40-50% of distance along the inner surface 306 between the mating faces 308, 310. The remainder of the inner surface 306 on each side of the central axis A2 may be free from spacers.

A longitudinal plane associated with each of the spacers 208-1 . . . 208-8 is substantially parallel with a longitudinal plane associated with the other ones of the spacers 208-1 . . . 208-8, i.e. not all of the spacers 208-1 . . . 208-8 extend in a direction that is normal to the inner surface 306. The longitudinal plane associated with each of the spacers 208-1 . . . 208-8 is a plane extending along a length of the spacer and through a top and bottom of the spacer, and may bisect the spacer. The spacer 208-1, for example, has a longitudinal plane in which the lines L1 and L2 lie, and the spacer 208-2 has a longitudinal plane in which the lines L3 and L4 lie. The longitudinal planes for the spacers 208-1, 208-2 are substantially parallel to each other when an elongate member is not supported thereby. With this configuration, the spacers 208-1 . . . 208-8 deflect when compressed against an elongate member to centrally support the elongate member within the cavity 110 (FIG. 1) and to provide a frictional resistance against sliding movement between the elongate member and the duct thereby avoiding repositioning of the duct relative to the elongate member.

Figure 5:
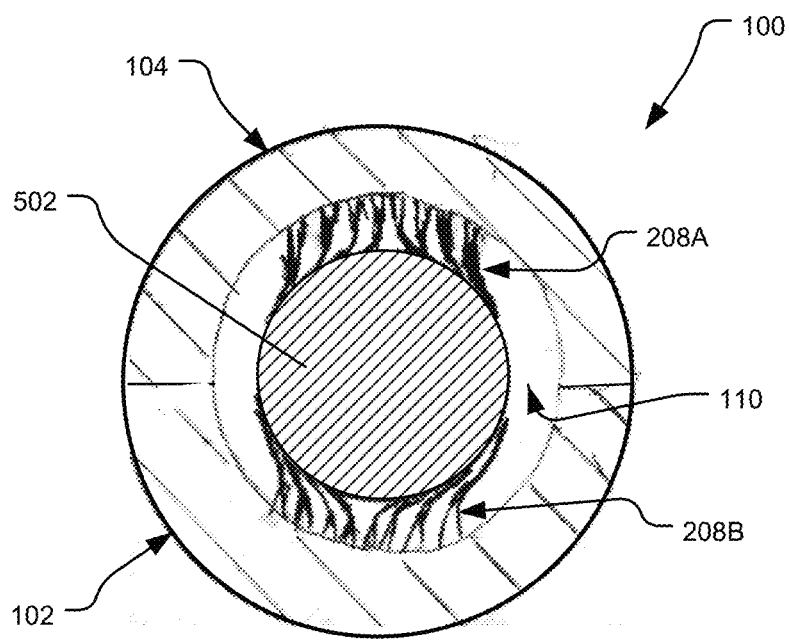
FIG. 5 is a sectional view of a separation duct consistent with the present disclosure enclosing an elongate member.

FIG. 5, for example, is a sectional view of a duct 100 consistent with the present disclosure with an elongate member 502 disposed within a cavity 110 defined by separation duct segments 102, 104 consistent with the present disclosure. As shown, when the separation duct segments 102, 104 are compressed against the elongate member, the spacers 208A on the top segment 104 and the spacers 208B on the bottom segment 102 deflect and substantially center the elongate member 502 within the cavity 110. Advantageously, the spacers 208A, 208B may be configured to deflect and centrally support elongate members 502 of different outside dimensions. For example, larger diameter elongate members 502 may cause greater deflection of the spacers 208A, 208B, whereas smaller diameter elongate members 502 may cause relatively less deflection of the spacers 208A, 208B. With elongate members 502 of different dimensions the deflection of the spacers 208A, 208B against the elongate member 502 along the length of the spacers centrally supports the elongate member 502 while providing frictional resistance against slippage of the elongate member 502 relative to the separation duct segments 102, 104.

According to one aspect of the disclosure, there is provided a separation duct segment configured to be combined with at least one additional separation duct segment for encompassing an elongate member. The separation duct segment includes an elongate body having an outer surface an inner surface, the outer surface and the inner surface being bridged at ends thereof by associated mating faces. A plurality of spacers extend inwardly away from the inner surface and extend longitudinally from a location adjacent a first end of the elongate body in a direction toward a second end of the elongate body. A longitudinal plane associated with each of the spacers is substantially parallel with a longitudinal plane associated with the other ones of the spacers, the longitudinal plane associated with each of the spacers being a plane extending along a length of the spacer and through a top and bottom of the spacer.

According to another aspect of the disclosure there is provided a separation duct segment configured to be combined with at least one additional separation duct segment for encompassing an elongate member. The separation duct segment includes an elongate body having a semi-annular cross-section with a convex semi-circular outer surface and a concave semi-circular inner surface, the outer surface and the inner surface being bridged at ends thereof by associated mating faces. A plurality of spacers extend inwardly away from the inner surface and extend longitudinally from a location adjacent a first end of the elongate in a direction toward a second end of the elongate body. The spacers are resiliently deformable and a first one of the spacers closest to one of the associated mating faces has a height greater than second one of the spacers furthest from the one of the associated mating faces. A longitudinal plane associated with each of the spacers is substantially parallel with a longitudinal plane associated with the other ones of the spacers, the longitudinal plane associated with each of the spacers being a plane bisecting the spacer and extending along a length of the spacer and through a top and bottom of the spacer.

According to another aspect of the disclosure there is provided a separation duct for encompassing an elongate member. The separation duct includes an outer surface, an inner surface and a central cavity. A plurality of spacers extend inwardly away from the inner surface at intervals along a length of the duct, and extend longitudinally in a direction of a longitudinal axis of the duct. A longitudinal plane associated with each of the spacers is substantially parallel with a longitudinal plane associated with the other ones of the spacers, the longitudinal plane associated with each of the spacers being a plane extending along a length of the spacer and through a top and bottom of the spacer.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. The terms "connected" or "coupled" as used herein is a relative term and does not require a direct physical connection unless otherwise stated herein.

Although the terms "first," "second," "third" etc. may be used to describe various elements, components and/or sections, these elements, components and/or sections are not to be limited by these terms as they are used only to distinguish one element, component or section from another element, component or section. Thus, a first element, component or section could be termed a second element, component or section without departing from the scope and teachings of the present disclosure.

Spatially relative terms, such as "beneath," "below," "upper," "lower," "above" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, for example, the exemplary term "below" can encompass both an orientation of above and below. The device may be otherwise oriented (rotated 90 degrees or at other orientations) and the spatially relative descriptors used herein interpreted accordingly.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A duct segment comprising:
   a body having an inner surface; and
   a first spacer and a second spacer arranged on the inner surface,
   wherein the first spacer extends longitudinally from a first position on the inner surface of the body toward a second position on the inner surface of the body,
   wherein the second spacer extends longitudinally from a third position on the inner surface of the body toward a fourth position on the inner surface of the body,
   wherein a first longitudinal plane associated with the first spacer is parallel or approximately parallel with a second longitudinal plane associated with the second spacer, and
   wherein the first and second spacers have different heights.

2. The segment of claim 1, wherein the first longitudinal plane extends along a length of the first spacer and through a top and a bottom of the first spacer.

3. The segment of claim 1, wherein the second longitudinal plane extends along a length of the second spacer and through a top and a bottom of the second spacer.

4. The segment of claim 1, wherein the duct segment is configured to be combined with at least one additional duct segment, the combination forming a cavity for supporting or encompassing an elongate member via at least the first and second spacers.

5. The segment of claim 4, wherein the elongate member is an optical cable, an electrical cable, a pipeline, or a tube.

6. The segment of claim 1, wherein the first spacer or the second spacer, or both, are deformable.

7. The segment of claim 1, wherein the first spacer or the second spacer, or both, have a triangular shape or a generally triangular shape.

8. A method comprising:
disposing one or more segments of an optical cable in a separation duct, or fitting the separation duct on to the one or more segments of the optical cable, such that the optical cable is at least partially supported or suspended by a plurality of spacers extending longitudinally within an internal cavity of the separation duct; and
deploying the one or more segments of the optical cable with the separation duct undersea, and
wherein a first longitudinal plane associated with a first spacer of the plurality of spacers is parallel or approximately parallel with a second longitudinal plane associated with a second spacer of the plurality of spacers.

9. The method of claim 8, wherein the plurality of spacers have different heights.

10. The method of claim 8, wherein the plurality of spacers are deformable.

11. The method of claim 8, wherein the plurality of spacers have a triangular shape or a generally triangular shape.

12. A separation duct comprising:
an inner surface;
a central cavity; and
a first plurality of spacers arranged on the inner surface,
wherein each spacer of the first plurality of spacers extends along a longitudinal axis of the separation duct,
wherein longitudinal planes associated with the first plurality of spacers are parallel or substantially parallel relative to each other, and
wherein the first plurality of spacers have different heights.

13. The separation duct of claim 12, wherein the spacers are deformable.

14. The separation duct of claim 12, wherein the spacers have a triangular shape or a generally triangular shape.

15. The separation duct of claim 12, further comprising:
a second plurality of spacers arranged on the inner surface opposed to the first plurality of spacers; and
wherein each spacer of the second plurality of spacers extends along the longitudinal axis of the separation duct, and
wherein longitudinal planes associated with the second plurality of spacers are parallel or substantially parallel relative to each other.

16. The separation duct of claim 15, wherein the first plurality of spacers and the second plurality of spacers are arranged at an area of reduced external dimension of the separation duct.

17. The separation duct of claim 16, wherein the area of reduced external dimension included at least a tension band to compress the first plurality of spacers and the second plurality of spacers against an elongate member.

18. The separation duct of claim 12, wherein the first plurality of spacers at least partially supports or suspends an elongate member in the central cavity.

* * * * *